United States Patent Office

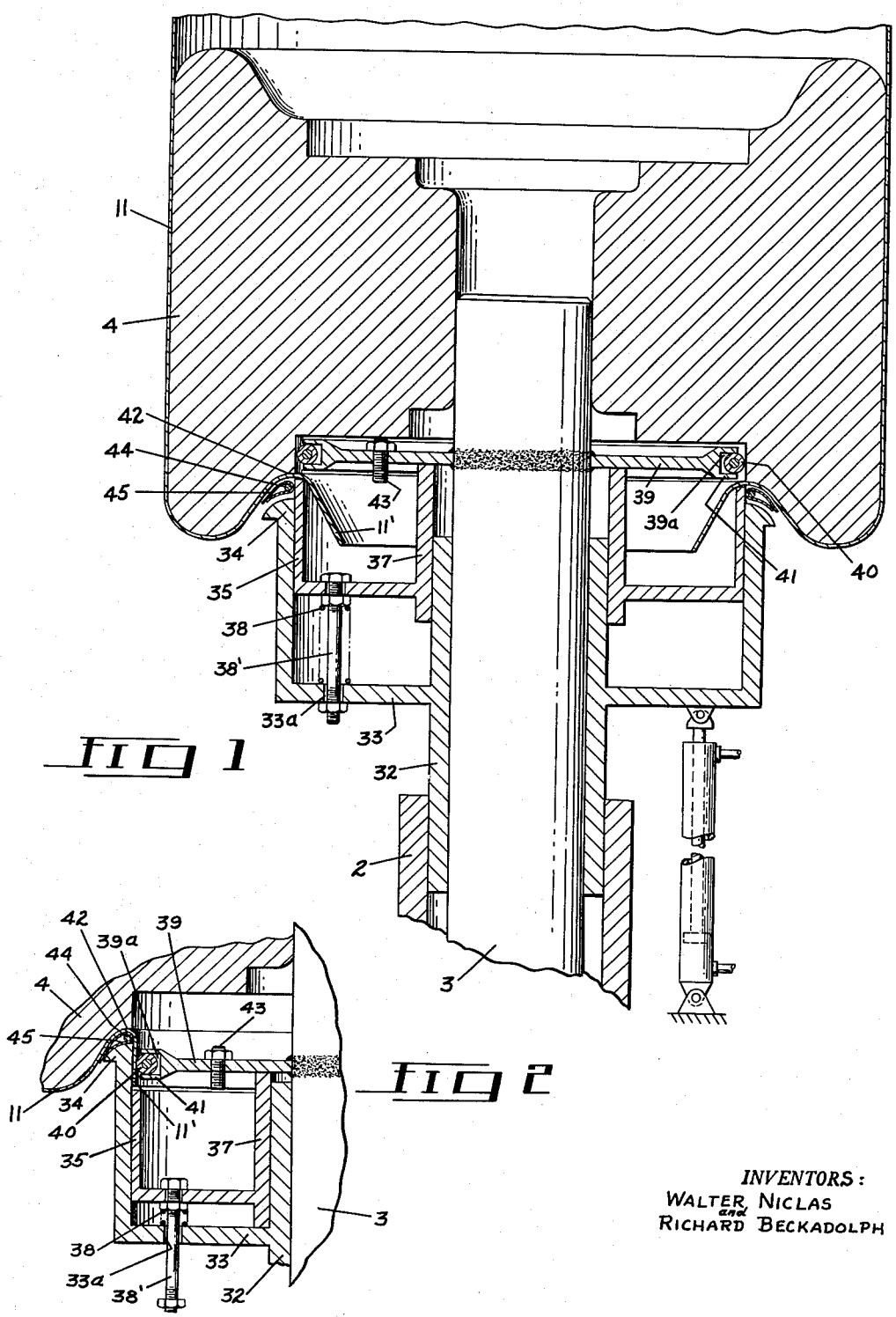

2,997,094
Patented Aug. 22, 1961

2,997,094
MACHINE FOR MAKING CARCASSES FOR PNEUMATIC TIRES
Walter Niclas, Altwarmbuchen, and Richard Beckadolph, Grasdorf, Germany, assignors to Continental Gummi-Werke Aktiengesellschaft, Hannover, Germany
Filed May 7, 1956, Ser. No. 583,010
Claims priority, application Germany May 9, 1955
7 Claims. (Cl. 154—10)

The present invention concerns a machine for making carcasses for pneumatic tires, which comprises drum adapted to receive the fabric layers forming the carcasses and also provided with gripper means movable in a radial direction with regard to said drum for grasping the edge portions of the fabric layers and pressing the same under tension against the drum. A machine of this type is disclosed in assignee's copending application Serial No. 463,252 filed October 19, 1954, now Patent No. 2,967,564. With the arrangement disclosed in the said copending application, the drum for receiving the fabric layers is easily detachably mounted and is movable in an axial direction. Furthermore, between the gripping means and the drum, controlling members are effective so that the radial movements of the gripping means are controlled by the axial movement of the drum.

It is known to use a bead placing device the bead holder of which is movable axially with regard to the drum, in connection with machines having radially movable gripping means adapted to grasp the marginal portions of the fabric layers and to press the same under tension against the drum.

It is an object of the present invention so to improve the bead placing device that, for all practical purposes, it will be impossible to damage the fabric layers on the drum during the placement of the bead.

It is still another object of this invention to provide a bead placing device for forming the fabric around the bead which will be highly effective, reliable and rather simple in construction.

These and other objects and advantages of the invention will appear more clearly from the following specification in connection with the accompanying drawings in which:

FIG. 1 represents a vertical partial section through a machine for making carcasses for pneumatic tires, which is equipped with a bead placing device according to the present invention.

FIG. 2 illustrates a small portion of FIG. 1 showing an advanced step during the formation of the fabric around the bead.

*General arrangement*

The bead holder according to the present invention is characterized in that it consists of two parts which are guided concentrically with regard to each other and are movable within each other in a telescopic manner against a force continuously urging said parts into a certain position relative to each other. The outer circumferential surface of the inner part or inner member and the front face of the outer part or outer member serve as contacting surfaces for the head. In this way, when actuating the bead placing device, the inner member of the bead holder will move telescopically relative to the outer member. Thus, when the top of the inner member, the outer circumferential surface of which supports the bead, abuts the fabric layer, a further axial movement of the inner member of the bead holder is prevented.

A maximum in safety will be obtained if the axial movement of the inner member of the bead holder is limited by a terminal abutment in the direction toward the drum. In order additionally to prevent any damage to the bead by the axial movement of the radial outer member of the bead holder, and also in order to prevent any damage to the flags or fabric forming portions surrounding the bead, the arrangement may be such that the drum carrying the fabric layers is displaced on its shaft by the outer member of the bead holder. In other words, the drum is not rigidly mounted on its shaft but will be displaced by the outer member of the bead holder. This makes it possible to continue the axial movement of the outer member of the bead holder until the drum has detached itself entirely or to a major extent from its shaft. In this way, additional devices for withdrawing the drum from its shaft will be superfluous.

The machine according to the invention may furthermore be provided with a stationary ring or the like which will be located inside the drum during the operation of the machine, i.e. during the actual placement of the fabric layers. The outer diameter of said ring is slightly less than the inner diameter of the bead portions of the tire so that during an axial movement of the drum relative to the stationarily mounted ring, the free inwardly directed marginal portions of the fabric layers will slide over the ring. This materially facilitates the further manufacture of the tire inasmuch as now the fabric layers already rest against the inner circumferential surface of the beads. Expediently, the stationarily mounted ring over which the marginal portions of the fabric slide, becomes effective when the outer member of the bead holder brings about an axial displacement of the drum relative to its shaft. The stationarily mounted ring thus brings about a further molding of the fabric layers to be placed when the annular body is removed from its shaft.

*Structural arrangements*

Referring now to the drawings in detail, the holding tube is designated with the reference numeral 2, while the drum for receiving the fabric layers is designated with the reference numeral 4. Slidably mounted in the tube 2 is a shaft or supporting mandrel 3 for the drum 4. The mandrel or shaft 3 serves as a guide for the drum and is slidably engaged therewith. The fabric layers on the drum which are formed into the carcass of the tire are designated with the reference numeral 11.

The shaft or mandrel 3 of the drum 4 does not slide directly on the inner surface of the holding tube 2. Between these two elements there is rather a guiding tube 32 which is movable in the axial direction of the drum 4. The tube 32 slidably rests against the holding tube 2 and supports the shaft or mandrel 3. Fixedly connected with the tube 32 by means of radial arms 33 is the outer member 34 of the bead holder proper the front surface of which is rounded. The inner member 35 of the bead holder is connected with guiding members 37 by means of radial struts. The guiding members 37 are slidable on the outer surface of the tube 32. Between the members 34 and 35 around a bolt 38' there is provided a pressure spring 38 continuously urging the members 34 and 35 into the position shown in FIG. 1. As will be evident from FIG. 1, the radial arm 33 has a bore 33a therethrough through which the bolt 38' may slide when the member 35 moves toward the radial arm 33.

An annular disc 39 is fixedly connected to the shaft or mandrel 3 in any convenient manner for instance by welding. The outer peripheral portion of the disc 39 is provided with a groove 39a (FIG. 2) having journalled therein a ring 40 which may be designed as a helical rotatable spring. The annular disc 39 with the ring 40 is so arranged with regard to the drum 4 that the disc 39 will be located within a recess in the bottom of said drum during the operation of the machine, when the drum 4 is firmly engaged with shaft or mandrel 3. The lower surface 41 of the annular disc 39, when it is located within said recess is located at about the same level as the edge 42 of said recess in the drum 4. If desired, the surface 41 may also be somewhat higher than the edge 42 but must not be lower than said edge 42. The annular disc 39 is preferably provided with one or more abutments 43 which are adjustable and distributed over the circumference of disc 39. The drum 4 rests against the abutments 43.

The bead for the tire is designated with the reference numeral 44, whereas its flags or bead shaping portions are designated with the reference numeral 45. According to the embodiment shown in the drawing, the front end surface of the outer member 34 and the outer circumferential surface of the inner member 35 serve as resting surface or molding surface for the bead 44 with its flag 45.

The operation of the bead placing device according to the invention is as follows: Assume that a bead 44 together with the enveloping fabric strip 45 is placed about the upper end of inner member 35 resting on the upper end of outer member 34. The members 34 and 35 are at this time retracted downwardly until arms 33 rest on the upper end of tube 2. The fabric layers 11 are placed on drum 4 and the drum is located on shaft or mandrel 3 and rests on abutment screws 43. Also, the marginal portion 11' of the fabric layers 11 is formed inwardly so as to be disposed between the upper end of inner member 35 and the annular disc 39.

The bead is then placed by moving the inner and outer members upwardly toward drum 4 by energizing a motor connected to outer member 34. During this upward movement tube 32 is guided on shaft or mandrel 3.

Spring 38 serves to support inner member 35 on outer member 34 during this movement. The upward movement of the members 34 and 35 continues until sleeve portion 37 of inner member 35 engages annular disc 39 whereupon movement of inner member 35 halts while upward movement of outer member 34 and bead 44 continues.

It is to be noted that the marginal portion 11' of the fabric layers 11 is at this time located between inner member 35 and annular member 39. The parts of the device are now in their FIG. 1 position.

Further upward movement of outer member 34 pushes bead 44 against the fabric layers at the bottom of drum 4, and drum 4 then commences to move with outer member 34.

Annular member 39, in being fixed to shaft or mandrel 3, does not move upwardly with drum 4 so that as drum 4 moves upwardly, the said marginal portions 11' of the fabric layers 11 on the drum are ironed downwardly into the inside of inner member 35 by ring 40 on member 39 as shown in FIG. 2.

Continued movement upwardly of outer member 34 will lift drum 4 on shaft or mandrel 3 until the drum is mostly or completely removed therefrom, whereupon the drum may be received by another supporting device, such as another mandrel for movement to another work station for further operation on the tire carcass.

By subdividing the bead holder into an inner and an outer member and by making the members 34 and 35 displaceable relative to each other, in co-operation with the annular disc serving as terminal abutment, damage to the fabric layers by the top of the inner member 35 during the pressing of the bead 44 against the drum 4 will be avoided. Also, when the drum 4 is displaced upwardly by the outer member 34, the inner member 35 is withdrawn from the bead 44 and the inner circumferential surface of the bead 44 becomes exposed so as to press against or be directly engaged by the surface of the marginal portions of the fabric layer 11 (FIG. 2). This pressing operation is effected by means of the ring 40.

It may be added that it is, by no means necessary, to journal and guide the bead holder by means of a tube 32 between the holding tube 2 and the shaft or mandrel 3.

If desired, the tube 32 may also be movably journalled upon the outer circumferential surface of the holding tube 2. Furthermore, if tube 2 is designed accordingly, the annular disc 39 may be fixedly connected to the tube 2. It is merely necessary so to journal the annular disc 39 that the latter is fixed when the drum 4 is moved relative to its shaft or mandrel 3, i.e. is withdrawn from said shaft or mandrel 3.

While placing or pressing the fabric layers 11 by means of gripper pairs (not shown) into their proper positions, the tube 32 or bead placing device is moved downwardly to such an extent that the gripper pairs will have the necessary freedom of movement. Inasmuch as the outer member 34 of the bead holder must have a diameter in conformity with the drum 4, it is expedient to design the gripper pairs in an offset manner so that the movement of the gripper pairs will not be interfered with by the bead placing device.

It is, of course, to be understood that the present invention is, by no means, limited to the particular construction shown in the drawing, but also comprises any modifications within the scope of the appended claims.

What we claim is:

1. In a tire building apparatus: a mandrel, a drum adapted to receive fabric layers for forming a tire carcass thereon, said drum being mounted on said mandrel and being axially movable thereon, a bead setting device substantially coaxially arranged with regard to said drum and axially slidably mounted on said mandrel, said bead setting device comprising two annular bodies telescopically arranged within and movable relative to each other, and a ring member carried by said mandrel in axially fixed relationship thereto, said bead setting device and said drum being adapted to receive a tire bead therebetween, and said bead setting device and said ring member being adapted to receive therebetween the edge portion of fabric layers on said drum, and said bead setting device being movable on said mandrel in a direction toward said ring member for axially moving said drum away from said ring member whereby the free end portions of said fabric layers adjacent said bead setting device will slide along said ring member and be folded toward said tire bead.

2. In a tire building apparatus: a mandrel, a drum adapted to receive fabric layers for forming a tire carcass thereon, said drum being mounted on said mandrel and being axially movable thereon, a bead setting device substantially coaxially arranged with regard to said drum and axially slidably mounted on said mandrel, said bead setting device comprising two annular bodies telescopically arranged within and movable relative to each other, a disc provided with a peripheral groove and fixedly connected to said mandrel, and a ring mounted in said peripheral groove, said bead setting device and said drum being adapted to receive a tire bead therebetween, and said bead setting device and said ring member being adapted to receive therebetween the edge portion of fabric layers on said drum, and said bead setting device being movable on said mandrel in a direction toward said ring for axially moving said drum away from said ring whereby the free end portions of said fabric layers adjacent said bead setting device will slide along said ring and be folded toward said tire bead.

3. In a tire building apparatus: a mandrel, a drum adapted to receive fabric layers for forming a tire carcass thereon, said drum being mounted on said mandrel and being axially movable thereon, a bead setting device substantially coaxially arranged with regard to said drum and axially slidably mounted on said mandrel, said bead setting device comprising two annular bodies telescopically arranged within and movable relative to each other, spring means interposed between said two annular bodies and continuously urging the same away from each other, and a ring member carried by said mandrel in axially fixed relationship thereto, said bead setting device and said drum being adapted to receive a tire bead therebetween, and said bead setting device and said ring member being adapted to receive therebetween the edge portion of fabric layers on said drum, and said bead setting device being movable on said mandrel in a direction toward said ring member for axially moving said drum away from said ring member whereby the free end portions of said fabric layers adjacent said bead setting device will slide along said ring member and be folded toward said tire bead.

4. In a tire building apparatus: a mandrel, a drum adapted to receive fabric layers for forming a tire carcass thereon, said drum being mounted on said mandrel and being axially movable thereon, a bead setting device substantially coaxially arranged with regard to said drum and axially slidably mounted on said mandrel, said bead setting device comprising an inner and an outer annular body telescopically arranged within and movable relative to each other, abutment means arranged for engagement with said inner annular body for limiting the axial movement of the latter in the direction toward said drum, and a ring member carried by said mandrel in axially fixed relationship thereto, said bead setting device and said drum being adapted to receive a tire bead therebetween, and said bead setting device and said ring member being adapted to receive therebetween the edge portion of fabric layers on said drum, and said bead setting device being movable on said mandrel in a direction toward said ring member for axially moving said drum away from said ring member whereby the free end portions of said fabric layers adjacent said bead setting device will slide along said ring member and be folded toward said tire bead.

5. In a tire building apparatus: a mandrel, a drum adapted to receive fabric layers for forming a tire carcass thereon, said drum being mounted on said mandrel and being axially movable thereon, a bead setting device substantially coaxially arranged with regard to said drum and axially slidably mounted on said mandrel, said bead setting device comprising an inner and an outer annular body telescopically arranged within and movable relative to each other, disc means fixedly connected to said mandrel, abutment means carried by said disc means for limiting the axial movement of said inner annular body in the direction toward said drum, and a ring member carried by the peripheral portion of said disc means, said bead setting device and said drum being adapted to receive a tire bead therebetween, and said bead setting device and said ring member being adapted to receive therebetween the edge portion of fabric layers on said drum, and said bead setting device being movable on said mandrel in a direction toward said ring member for axially moving said drum away from said ring member whereby the free end portions of said fabric layers adjacent said bead setting device will slide along said ring member and be folded toward said tire bead.

6. In a tire building apparatus: a mandrel, a drum adapted to receive fabric layers for forming a tire carcass thereon, said drum being mounted on said mandrel and being axially movable thereon, a bead setting device substantially coaxially arranged with regard to said drum and axially slidably mounted on said mandrel, said bead setting device comprising an inner and an outer annular body telescopically arranged within and movable relative to each other, disc means fixedly connected to said mandrel, adjustable abutment means carried by said disc means for engagement with said drum to allow said drum to rest upon said abutment means, and a ring member carried by the peripheral portion of said disc means, said bead setting device and said drum being adapted to receive a tire bead therebetween, and said bead setting device and said ring member being adapted to receive therebetween the edge portion of fabric layers on said drum, and said bead setting device being movable on said mandrel in a direction toward said ring member for axially moving said drum away from said ring member whereby the free end portions of said fabric layers adjacent said bead setting device will slide along said ring member and be folded toward said tire bead.

7. In a tire building apparatus: a mandrel, a drum adapted to receive fabric layers for forming a tire carcass thereon, said drum being mounted on said mandrel and being axially movable thereon, an outer annular member concentrically surrounding said mandrel and having an end face facing said drum for engagement with a bead ring when such bead ring is interposed between said end face and fabric layers placed on said drum, said outer annular member being movable in axial direction of and relative to said mandrel, an inner annular member having an annular wall engaging said outer annular member and telescopically movable thereon, said inner annular member being movable relative to said mandrel and in axial direction thereof, said inner annular member having an end portion movable near said end face of said outer annular member for engagement with the inner side of said bead ring and with the respective adjacent portion of said fabric layers, and an annular folding member carried by said mandrel in axially fixed relationship thereto and having an outer diameter slightly larger than the inner diameter of said annular wall whereby the free end portions of said fabric layers will be folded over said end face of said outer annular member in response to an axial movement of said drum in a direction away from said folding member.

References Cited in the file of this patent
UNITED STATES PATENTS

| | | |
|---|---|---|
| 2,313,035 | Breth | Mar. 9, 1943 |
| 2,393,504 | Stevens | Jan. 2, 1946 |
| 2,394,465 | McChesney | Feb. 5, 1946 |
| 2,455,038 | Breth | Nov. 30, 1948 |
| 2,488,863 | Haase | Nov. 22, 1949 |